United States Patent [19]

Sirota

[11] Patent Number: 4,543,971
[45] Date of Patent: Oct. 1, 1985

[54] UMBRELLA HOLDER

[76] Inventor: Vladimir Sirota, 263 Congressional Lane, #711, Rockville, Md. 20852

[21] Appl. No.: 506,423

[22] Filed: Jun. 20, 1983

[51] Int. Cl.⁴ ............................................. A45B 17/00
[52] U.S. Cl. .................................... 135/16; 135/20 M; 135/22
[58] Field of Search .................. 135/88, 90, 98, 20 M, 135/20 R, 16, 87, 89, 107, 109, 117, 903, 905; 290/159, 160, 165, 168, 171; 343/711, 899; 52/632

[56] References Cited

U.S. PATENT DOCUMENTS

| | | | |
|---|---|---|---|
| 1,577,227 | 3/1926 | Greenwald | 135/33 C |
| 1,988,380 | 1/1935 | Goldberg | 135/98 X |
| 2,532,989 | 12/1950 | Biondi | 135/90 X |
| 3,508,560 | 4/1970 | Kitani | 135/20 R |
| 4,011,881 | 3/1977 | Becher | 135/34 X |
| 4,132,236 | 1/1979 | Petersen et al. | 135/20 M X |

FOREIGN PATENT DOCUMENTS 623977  3/1927  France ............................. 135/33 C Primary Examiner—James R. Feyrer
Assistant Examiner—Danton DeMille
Attorney, Agent, or Firm—Ilya Zborovsky

[57] ABSTRACT

An umbrella holder stores the umbrella in a closed position and ejects the umbrella into an opened position. Thus, if mounted in an automobile it can be operated from within to prepare an open umbrella for a passenger so that it can be used immediately without getting wet. Also, the umbrella is stored conveniently back in the holder from outside the car. Manual, automatic or semiautomatic controls eject the umbrella and reposition the umbrella in the holder for storage. Also the open umbrella may be closed and stored from inside the car, by automatic means.

4 Claims, 5 Drawing Figures

UMBRELLA HOLDER

FIELD OF INVENTION

This invention relates to umbrella mechanisms, and more particularly, it relates to holder means for storing umbrellas and automatically presenting them upon demand in open position ready for use, such as outside an automobile door.

BACKGROUND ART

Umbrella holders for placing umbrellas in accessible position for use are well known. For example, Belzer U.S. Pat. No. 3,124,287—Mar. 10, 1964 has such holders conveniently located inside an automobile. The umbrellas can be manually removed from such holders, taken out of the automobile and opened for use. However, when it is raining outside the car, a person may get wet before the umbrella can be removed from the car, opened and used, and has no protection against rain while getting out of the car to open the umbrella.

Self-opening and self-closing type of automatic umbrellas have also long been known. For example, consider Thur U.S. Pat. No. 3,828,805—Aug. 13, 1974 for a self-closing automatic umbrella. However, it has not been possible with these umbrellas to store them in a holder and present them in open position ready for use upon demand, or to open them from the inside of an automobile to protect the user when leaving the automobile.

DISCLOSURE OF THE INVENTION

This invention provides an auxiliary holder for an umbrella including mechanisms therein for storing the umbrella and for automatically releasing it from the stored position in an opened position ready for use. The umbrella also may be automatically closed while storing.

The invention provides a holder adapted to mount inside an automobile in a strategic location with access to the umbrella so that it will open outside the automobile to protect the user from the rain while leaving the automobile. The umbrella also is repositioned in a holder outside the car for storage.

Other objects, features and advantages of the invention will be found throughout the following description, the drawings and the claims.

THE DRAWINGS

THE PREFERRED EMBODIMENTS

Figure 1:
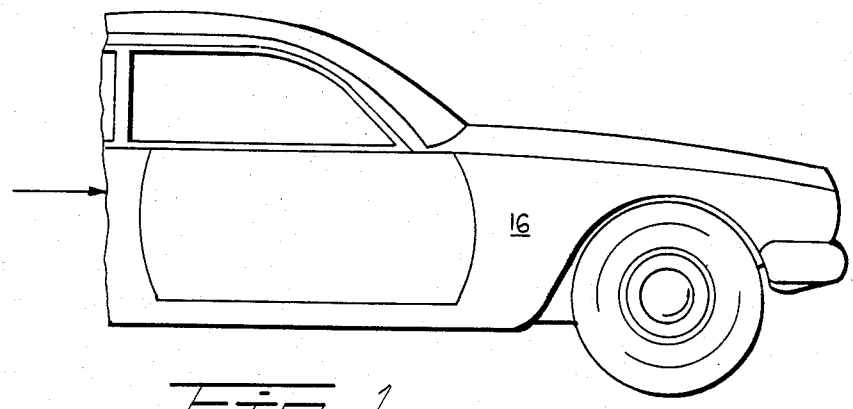
FIG. 1 is a view showing an automobile of a conventional design.
Figure 1A:
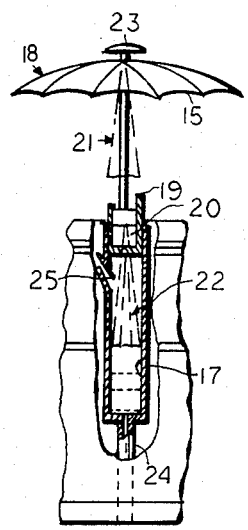
FIG. 1a is a partly broken away sketch of an automobile umbrella holder of the present invention in opened position for use outside of the automobile, with phantom views illustrating closure and storage of the umbrella in the holder, wherein the holder is located in the region indicated by the arrow in FIG. 1, that is in the region of a partition between side glasses of the automobile.

In FIG. 1a it may be seen that this invention provides an umbrella 15 that may be used in combination with an automobile 16 so that it may be operated from within to move from a storage holder 17 to an opened position 18 outside the automobile, thereby to protect the user emerging from the automobile from rainfall. By manual operation of a suitable detent or latch 19, the umbrella 15 may be removed from the holder 17 for manual use and conveyance. The holder 17 is mounted in the region indicated by the arrow in FIG. 1, or in other words in the region of a partition between a front side glass and a rear side glass of one side of the automobile 16. The holder can be arranged inside the partition, or at its inner or outer surfaces.

Similarly it may be installed and operated from inside a house to be available for use in opened position outside. Thus, the umbrella is stored in a way that will not take moisture inside.

After use the umbrella is returned into its movable platform 20 to be grasped thereby with suitable interengaging elements in a mating position, as exemplified by the detent latch 19. The umbrella is then closed as shown in phantom view 21 and returned into storage holder 17 in closed position as shown in phantom view 22.

For sealing the holder 17, generally cylindrical in form, the umbrella may include the uppermost sealing cap 23. Also it contains a drain pipe 24 suitably extended from the bottom of the holder 17 in order to drain off water and permit air circulation through the holder. Air vents 25 inside the car permit this air circulation, to prevent mildew, etc.

A latching mechanism (not shown in this view) holds the umbrella in place and permits its release from inside the car upon demand by manual impulse thereby to pop up in opened condition 18. This can be done by mechanisms, electric or hydraulic control circuits, etc., such as the type of controls and mechanisms referred to hereinafter.

Figure 2:
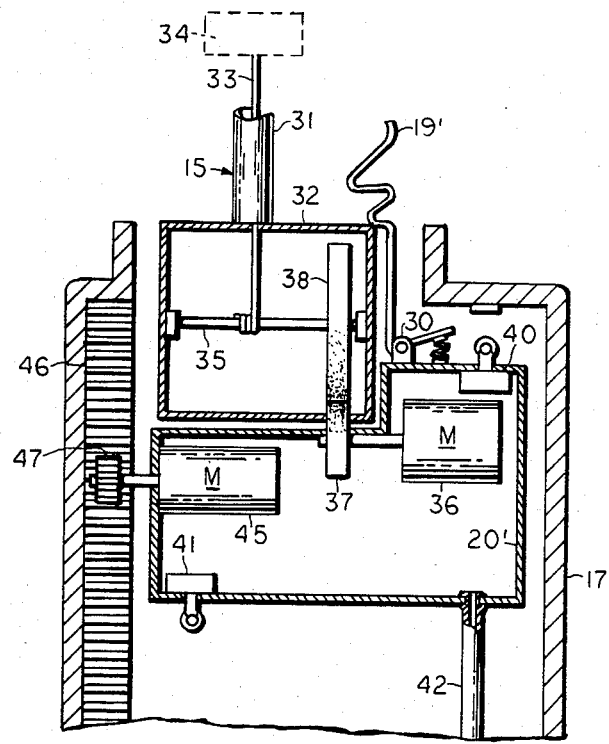
FIG. 2 is a fragmental diagrammatic sketch of a motor-powered embodiment of the invention, showing the mechanism for moving an umbrella relative to the holder.

FIG. 2 is a fragmental view of the top part of a holder cylinder 17 with a movable carriage 20' having umbrella grasping latch 19' pivoted thereon at 30. The carriage 20' is movable in the holder 17 cylinder to position the umbrella 15 having only the shaft 31 and the handle 32 as mated in latched position in carriage 20' sketched in this view.

The umbrella 15 is of the conventional type that opens automatically from an opening spring. There is shown a cable or cord 33 coupled with a part of the umbrella opening mechanism typically collar 34 to control the opening and closing. Thus, the reel 35, journalled in the handle 32, is provided so that the cord 33 may be reeled up when closing the umbrella 15 and unreeled when opening the umbrella 15. To effect this an electric motor 36 has a friction drive wheel 37 engaged by the friction rim 38 of the reel 35. That is, the electric motor when the wheels 37, 38 are frictionally engaged can reel up the cord 33 and close the umbrella 15 which is self-opening. If desired one way clutching of motor 36 drive wheel 37 will keep the umbrella closed until the friction wheels 37 and 38 separate as the carriage reaches the top of the holder cylinder 17 and actuates detent 19' to release the umbrella handle 32 so that it catches on the upper detent, from which it may be manually taken when desired, without any other attachment to the holder or mechanisms therein. In this position, the reel 35 can let cord 33 unwind and the umbrella will open. This therefore provides means for opening and closing the umbrella while it is extended outside the holder. These mechanisms can be controlled by suitable control circuits for motor 36, later described.

For operation of control circuits an upper limit switch 40 and lower limit switch 41 is provided. A cable 42 is arranged to carry suitable wiring to a remote actuating switch or switches suitably located for access and a source of power, such as an automobile battery.

A motive or transport motor 45 is provided with rack 46 and pinion 47 to move the carriage 20' up and down in the holder cylinder 17 between the operation of limit switches 40, 41.

Figure 3:
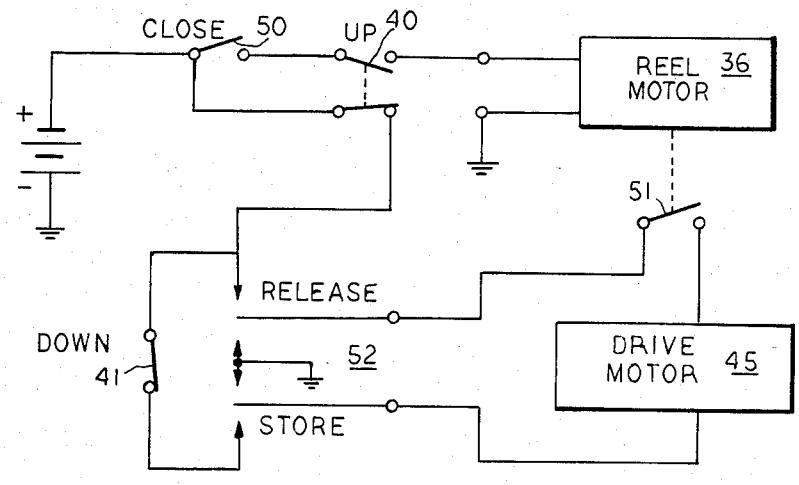
FIG. 3 is a schematic diagram of a control circuit for the FIG. 2 embodiment.

A simple manually operated semi-automatic control circuit is shown in FIG. 3. Thus, close switch 50 is used to close the umbrella by actuating the reel motor 36 and is of the momentary contact type. The upper limit switch 40 assures that the only time this may be done is when the carriage is at the upper limit. As shown, the umbrella is closed and there is preferably a limit switch 51 that will not permit the drive motor 45 to operate until the umbrella is fully closed, so that it may be slid down into the storage holder.

The drive motor 45 may then be used to store the umbrella by drive in one direction by way of momentary actuated reversing switch 52 or to release the umbrella by drive in the other direction. The respective limit switches 40 and 41 stop the drive motor when the umbrella is in proper up or down limiting position.

Figure 4:
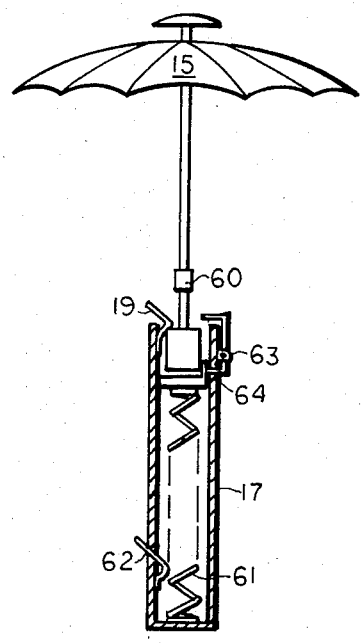
FIG. 4 is a diagrammatic view showing the internal mechanism of an umbrella holder in accordance with a further embodiment of the invention.

It is to be understood that other control circuits may be used and hydraulic or pneumatic systems if desired including fully automatic controls. However, one very simple mechanical system is illustrated by FIG. 4. This system delivers the umbrella 15 in open position automatically but requires manual storage by folding up the umbrella and inserting it in holder 17.

The umbrella 15 is of the spring opening type which pops open when a latch 60 is operated. The latch 19 as before described is a detent permitting manual removal of the umbrella 15 from holder 17. In this case the holder is loaded by spring 61 and has a seating latch 62 for holding the umbrella in stored position. Thus the umbrella is closed manually and pushed down until latched at 62 for storage.

To release, latch 62 is operated and the spring pushes the umbrella up to engage the top latch 19. Also trigger 63 operated by cam 64 will release the umbrella to let it spring open by engaging the opening latch 60.

For purpose of this invention, the umbrella "inside the automobile" may include one on a tubing affixed to the roof or side panel.

Any drive means can be used for opening the umbrella such as hydraulic, electric, electronic, pneumatic and other means. The holder can be provided with a closing element which closes the interior of the holder after withdrawal of the umbrella therefrom and opens for insertion of the umbrella into the holder.

The invention is not limited to the details shown since various modifications and structural changes are possible without departing in any way from the spirit of the present invention.

What is desired to be protected by Letters Patent as an invention is set forth in particular in the appended claims submitted herewith.

I claim:

1. An umbrella holder located in an automobile, for receiving a closed umbrella thereinto including a selectively actuated automatic mechanism for presenting an opened umbrella in a position permitting removal for manual use outside the automobile for conveyance and for receiving and storing the umbrella when returned to the holder, comprising in combination an umbrella with interengaging elements,
a substantially vertical holder for storing the umbrella with the interengaging elements in mating position,
first motor-operated means for moving a stored umbrella vertically upwardly out of the holder into a position accessible for manual removal and for moving the umbrella vertically downwardly into the holder,
second motor operated means for opening the umbrella outside the holder and closing the umbrella outside the holder, (for moving the umbrella vertically downwardly into the holder, motor-operated means for and)
grasping means on the holder for grasping the umbrella in closed position in the holder, and
switching means arranged so as to actuate said first motor-operated means for moving the stored umbrella out of the holder, to deactuate said first motor-operated means and actuate said second motor-operated means when the umbrella has been moved out of the holder for opening the umbrella, to actuate said second motor-operated means for closing the umbrella outside the holder, to deactuate said second motor-operated means and actuate said first motor-operated means when the umbrella has been closed for moving the closed umbrella into the holder.

2. An umbrella holder as defined in claim 1 mounted on an automobile with the holder inside the automobile adapted for presenting the opened umbrella outside the automobile in response to said switching means controlled from inside said automobile.

3. An umbrella holder as defined in claim 1, wherein said first-mentioned motor-operated means includes a mechanism operable for closing the umbrella before moving it into the holder.

4. An umbrella holder as defined in claim 1 wherein said second-mentioned motor-operated means includes a driven gear connected with the umbrella and a driving gear driven from a motor and meshing with the driven gear for transmission of rotation of the motor to the umbrella for opening and closing of the latter, said driven gear being disengageable from the driving gear by a vertical displacement of the umbrella so as to manually remove the umbrella from the holder.

* * * * *